United States Patent
Lindoff et al.

(10) Patent No.: US 9,571,229 B2
(45) Date of Patent: Feb. 14, 2017

(54) ADAPTATION OF RECEIVER SETTINGS IN A HETEROGENEOUS NETWORK

(75) Inventors: Bengt Lindoff, Bjärred (SE); Lars Lindbom, Karlstad (SE); Stefan Parkvall, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1460 days.

(21) Appl. No.: 12/901,677

(22) Filed: Oct. 11, 2010

(65) Prior Publication Data

US 2012/0044818 A1 Feb. 23, 2012

Related U.S. Application Data

(60) Provisional application No. 61/375,535, filed on Aug. 20, 2010.

(51) Int. Cl.
| | |
|---|---|
| H04L 1/00 | (2006.01) |
| H04W 72/08 | (2009.01) |
| H04W 36/04 | (2009.01) |
| H04W 72/04 | (2009.01) |
| H04W 84/04 | (2009.01) |

(52) U.S. Cl.
CPC .......... *H04L 1/0036* (2013.01); *H04W 72/082* (2013.01); *H04W 36/04* (2013.01); *H04W 72/0406* (2013.01); *H04W 84/045* (2013.01)

(58) Field of Classification Search
CPC .... H04L 1/0036; H04W 36/04; H04W 72/082
USPC .......... 370/241, 252, 310, 340, 341; 455/39, 455/63.1, 63.2
See application file for complete search history.

(56) References Cited

U.S. PATENT DOCUMENTS

| | | | | |
|---|---|---|---|---|
| 2006/0233153 | A1* | 10/2006 | Cheng et al. | 370/350 |
| 2007/0190945 | A1* | 8/2007 | Lee et al. | 455/63.1 |
| 2009/0247181 | A1* | 10/2009 | Palanki et al. | 455/452.2 |
| 2010/0151894 | A1 | 6/2010 | Oh et al. | |

FOREIGN PATENT DOCUMENTS

| | | |
|---|---|---|
| JP | 2009005096 A | 1/2009 |
| WO | 2010006285 A2 | 1/2010 |

* cited by examiner

*Primary Examiner* — Siming Liu
(74) *Attorney, Agent, or Firm* — Coats and Bennett, PLLC (57) ABSTRACT

Techniques are described for adapting receiver settings used by a mobile terminal operating in a heterogeneous network comprising macro cells and pico cells with overlapping coverage areas. A first set of subframes is allocated to the pico cells for downlink transmissions to a mobile terminal in a link imbalance zone. The mobile terminal acquires information about the subframe allocation and uses the subframe allocation information to select the signals used for adapting receiver settings used when operating in the link imbalance zone.

12 Claims, 7 Drawing Sheets

ADAPTATION OF RECEIVER SETTINGS IN A HETEROGENEOUS NETWORK

RELATED APPLICATION

This application claims the benefit of U.S. Provisional Patent Application 61/375,535 filed Aug. 20, 2010, which is incorporated herein by reference.

TECHNICAL FIELD

The present invention relates generally to heterogeneous networks comprising a mixture of low power and high power nodes with overlapping coverage and, more particularly, to adaptation of receiver settings by a mobile terminal operating in a heterogeneous network.

BACKGROUND

The new Third Generation Partnership Project (3GPP) standard known as Long Term Evolution (LTE) (3GPP LTE Rel-10) supports heterogeneous networks. In heterogeneous networks, a mixture of cells of different size and overlapping coverage areas are deployed. For example, a heterogeneous network may deploy pico cells served by relatively low power nodes within the coverage area of a macro cell served by relatively high power base stations. Heterogeneous networks could also deploy relatively low-power home base stations and relays to provide improved service in indoor areas. The aim of deploying low power nodes, such as pico base stations, home base stations, and relays, within a macro cell where coverage is provided by a high power base station is to improve system capacity by means of cell splitting gains, as well as to provide users with wide area experience of very high speed data access throughout the network. Heterogeneous deployment schemes represent one alternative to deployment of denser networks of macro cells and are particularly effective to cover traffic hotspots, i.e., small geographical areas with high user densities served by lower power nodes.

In heterogeneous networks, there may be a large disparity in output power of the low power nodes compared to the base stations serving macro cells. For example, the output power of the base stations in the macro cells may be in the order of 46 dBm, while the output power of the low power nodes in the pico cells may be less than 30 dBm. In some heterogeneous networks, the macro cells and pico cells operate on the same carrier frequencies and inter-cell interference coordination (ICIC) techniques are used to deal with interference when mobile terminals are operating in areas served by both macro cells and pico cells. For example, scheduling restrictions may be applied where a macro base station is prevented from transmitting in certain subframes, which may be referred to as "blank" subframes or restricted subframes. The pico cells can use these "blank" subframes to transmit data to mobile terminals operating in a link imbalance zone near the cell edge of the pico cells without interference from the macro base stations.

With the introduction of blank subframes in which the macro base station avoids scheduling downlink transmissions, mobile terminals close to the pica base station can be scheduled in all subframes. However, mobile terminals in the link imbalance zone receive signals with large signal strength variations between subframes. For instance in unrestricted subframes (where macro base stations are transmitting on downlink), pilot symbols and data transmitted from the pico cell could be up to 10 dB weaker than the pilots from the macro cell. If the mobile terminal adapts receiver settings based on these weak signals, bad reception performance might be the result.

SUMMARY

The present invention provides methods and apparatus for adapting receiver settings for a mobile terminal operating in a heterogeneous network comprising macro base stations and pico base stations with overlapping coverage areas. In exemplary embodiments, the mobile terminal acquires information about subframe allocation and uses the subframe allocation information to select the signals used for adapting receiver settings. For example, a first set of subframes may be allocated to the pico cells to use for downlink transmission to mobile terminals operating in a link imbalance zone. The macro cells may avoid scheduling downlink transmissions in the first set of subframes. The mobile terminal may have a first set of receiver settings for use when the mobile terminal is operating in the link imbalance zone. In this case, the mobile terminal may adapt the first set of receiver settings based on signals transmitted in the first subset of the subframes, which is reserved for the pico cell. The mobile terminal may also have a second set of receiver settings for use in performing signal measurements on neighboring macro cells. The mobile terminal may adapt the second set of receiver settings based on signals transmitted by the neighboring macro cells in a second set of subframes.

Some embodiments of the invention comprise methods implemented by a mobile terminal adapting receiver settings when the mobile terminal is operating in a heterogeneous network including macro cells and pico cells with overlapping coverage. In one exemplary method, the mobile terminal establishes a connection with the pico cell and receives subframe allocation information from the network indicating a first subset of subframes reserved for downlink transmissions by a pico cell to mobile terminals operating in a link imbalance zone. The subframe allocation information may be received by the mobile terminal when connected to a macro cell or pico cell. Based on the subframe allocation information, the mobile terminal adapts a first receiver setting for a receiver parameter using signals transmitted only in the first subset of subframes. The mobile terminal uses the first receiver setting when operating in a link imbalance zone. While operating in the link imbalance zone, the mobile terminal may then use the first receiver settings for a receiver parameter to receive and decode data transmitted in the first subset of subframes by the pico cell.

Other embodiments of the invention comprise a mobile terminal configured to operate in a heterogeneous network comprising macro base stations and pico base stations with overlapping coverage areas. In one embodiment, the mobile terminal comprises a receiver to receive signals transmitted by a base station on a downlink channel, a transmitter to transmit signals to the base station on an uplink channel, and a processor circuit. The processor circuit receives subframe allocation information from the network indicating a first subset of subframes reserved for downlink transmissions by a pico cell. The processor circuit adapts a first receiver setting for a receiver parameter based on pilot and/or data signals transmitted only in the first subset of subframes. The mobile terminal uses the first receiver setting when the mobile is operating in a link imbalance zone to receive and decode data transmitted in the first subset of subframes by the pico cell.

The present invention provides improved receiver performance for mobile terminals served by a pica cell operating in a link imbalance zone. In this scenario, the mobile terminal can adapt receiver settings based only on pilot and/or data signals transmitted in first set of subframes. Thus, the receiver settings are likely to be a better match for the interference conditions seen by the terminal when operating in the link imbalance zone.

DETAILED DESCRIPTION

Figure 1:
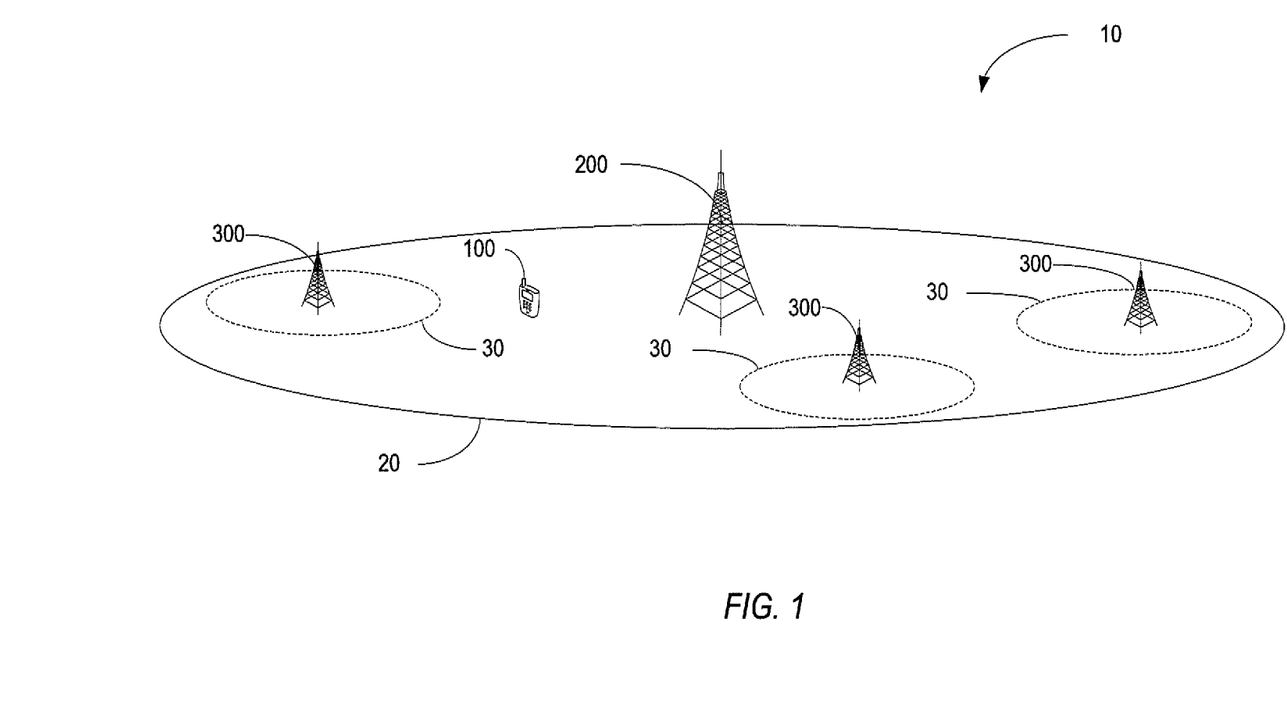
FIG. 1 illustrates macro and pico cell deployment in a mobile communication network.

Turning now to the drawings, FIG. 1 illustrates an exemplary heterogeneous communication network 10 according to one exemplary embodiment of the present invention. The present invention is described in the context of a Long-Term Evolution (LTE) network, which is specified in Release 10 of the LTE standard. However, those skilled in the art will appreciate that the invention may be applied in heterogeneous networks using other communication standards.

The communication network 10 comprises a plurality of high power access nodes providing radio coverage in respective macro cells 20 of the communication network 10. In the exemplary embodiment shown in FIG. 1, three pico cells 30 served by low power access nodes 300 are deployed within the macro cell 20. The low power access nodes may comprise pico base stations or home base stations. For convenience, the high power and low power access nodes 200, 300 will be referred to herein as the macro base stations 200 and pico base stations 300. The output power of the high power macro base stations 200 is presumed to be in the order of 46 dBm, while the output power of the pico base stations 300 is presumed to be less than 30 dBm.

In some heterogeneous networks 10, frequency separation between the different layers, i.e., macro and pico cells 20, 30 in FIG. 1, is used to avoid interference between the macro cells 20 and pico cells 30, respectively. When frequency separation is used, the macro base stations 200 and pico base stations 300 operate on different non-overlapping carrier frequencies to reduce interference between the macro and pico layers. Cell splitting gains are obtained when the radio resources in the pico cell 30 can be simultaneously used when the macro cell 20 is transmitting. However, frequency separation may lead to resource-utilization inefficiency. For example, when the pico cell 30 is lightly loaded so that its resources are not fully utilized, it may be more efficient to assign all carrier frequencies to the macro cell 20. However, the split of carrier frequencies between layers is typically static.

In some heterogeneous networks 10, radio resources on the same carrier frequencies are shared by the macro and pico layers by coordinating transmissions in the overlapping macro and pico cells 20, 30. This type of coordination is referred to as inter-cell interference coordination (ICIC). Certain radio resources are allocated for the macro cells 20 during a specified time period and the remaining resources can be accessed by pico cells 30 without interference from the macro cell 20. Depending on the load distribution across the layers, the resource split can change over time to accommodate different load distributions. In contrast to the splitting of carrier frequencies, sharing radio resources across layers using some form of ICIC can be made more or less dynamic depending on the implementation of the interface between the access nodes. In LTE, an X2 interface has been specified in order to exchange different types of information between base stations 200, 300. One example of such information exchange is that a base station 200, 300 can inform other base stations 200, 300 that it will reduce its transmit power on certain resources.

Time synchronization between base stations 200, 300 is required to ensure that ICIC across macro and pico layers will work efficiently in heterogeneous networks. Time synchronization is particularly important for time domain based ICIC schemes where resources on the same carrier are shared by macro and pico base stations.

Figure 2:
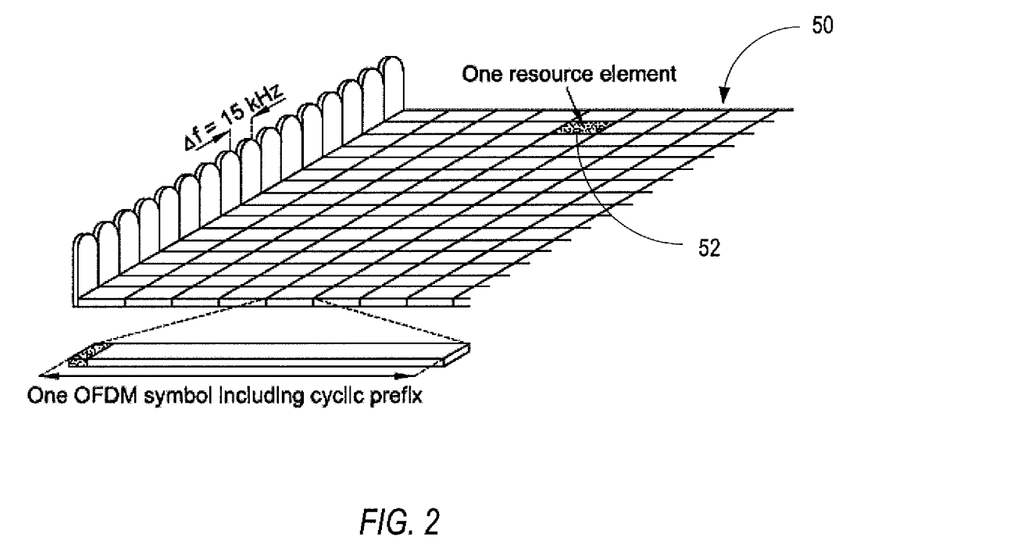
FIG. 2 illustrates downlink physical resources in an exemplary OFDM network.

LTE uses Orthogonal Frequency Division Multiplexing (OFDM) in the downlink and Discrete Fourier Transform (DFT) spread OFDM in the uplink. The basic LTE downlink physical resource can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element comprises one OFDM subcarrier during one OFDM symbol interval.

Figure 3:
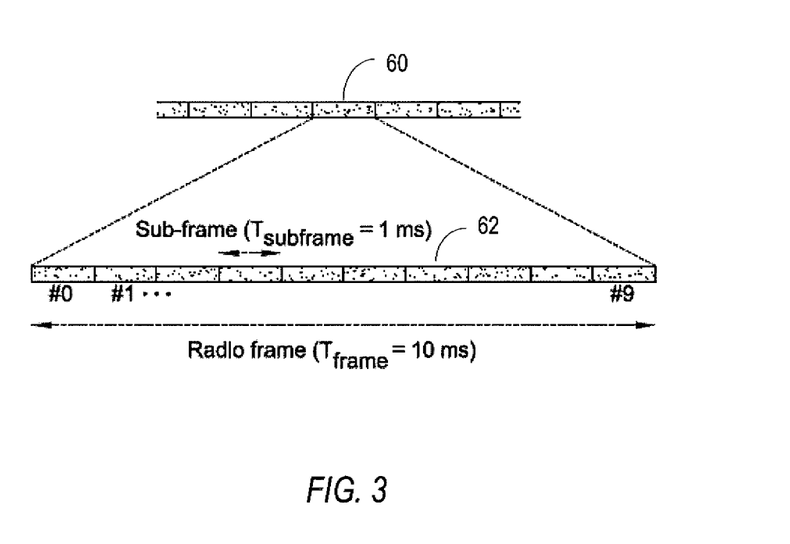
FIG. 3 illustrates an exemplary time-domain structure in an exemplary OFDM network.

In LTE systems, data is transmitted to the mobile terminals over a downlink transport channel known as the Physical Downlink Shared Channel (PDSCH). The PDSCH is a time and frequency multiplexed channel shared by a plurality of mobile terminals. As shown in FIG. 3, the downlink transmissions are organized into 10 ms radio frames 60. Each radio frame comprises ten equally-sized subframes 62. For purposes of scheduling users to receive downlink transmissions, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

Within a cell 20, 30, the base station 200, 300 dynamically schedules downlink transmissions to the mobile terminals 100 based on channel state and quality information (CSI, CQI) reports from the mobile terminals 100 on the Physical Uplink Control Channel (PUCCH) or Physical Uplink Shared Channel (PUSCH). The CQI reports indicate the instantaneous channel conditions as seen by the receiver. In each subframe, the base station 200, 300 transmits downlink control information (DCI) identifying the mobile terminals 100 that have been scheduled to receive data (hereinafter the scheduled mobile terminals) in the current downlink subframe and the resource blocks on which the data is being transmitted to the scheduled terminals. The DCI is typically transmitted on the Physical Downlink Control Channel (PDCCH) in the first two, three, or four OFDM symbols in each subframe.

In order to demodulate data transmitted on the downlink, the mobile terminals 100 need an estimate of the channel over which the data is transmitted. To facilitate channel estimation by the mobile terminal 100, the base station 200, 300 transmits reference symbols on the downlink which are known to the mobile terminal 100. By correlating the known reference signals with the received signal, the mobile terminal 100 obtains an estimate of the channel. In LTE, there are two types of reference signals: cell specific reference signals and mobile terminal specific reference symbols. The cell specific reference symbols are usually transmitted in all downlink subframes. The mobile terminal 100 may use the cell specific reference signals for both channel estimation and for performing signal measurements for mobility management purposes. Mobile terminal specific reference symbols may also be transmitted and used for channel estimation.

Figure 4:
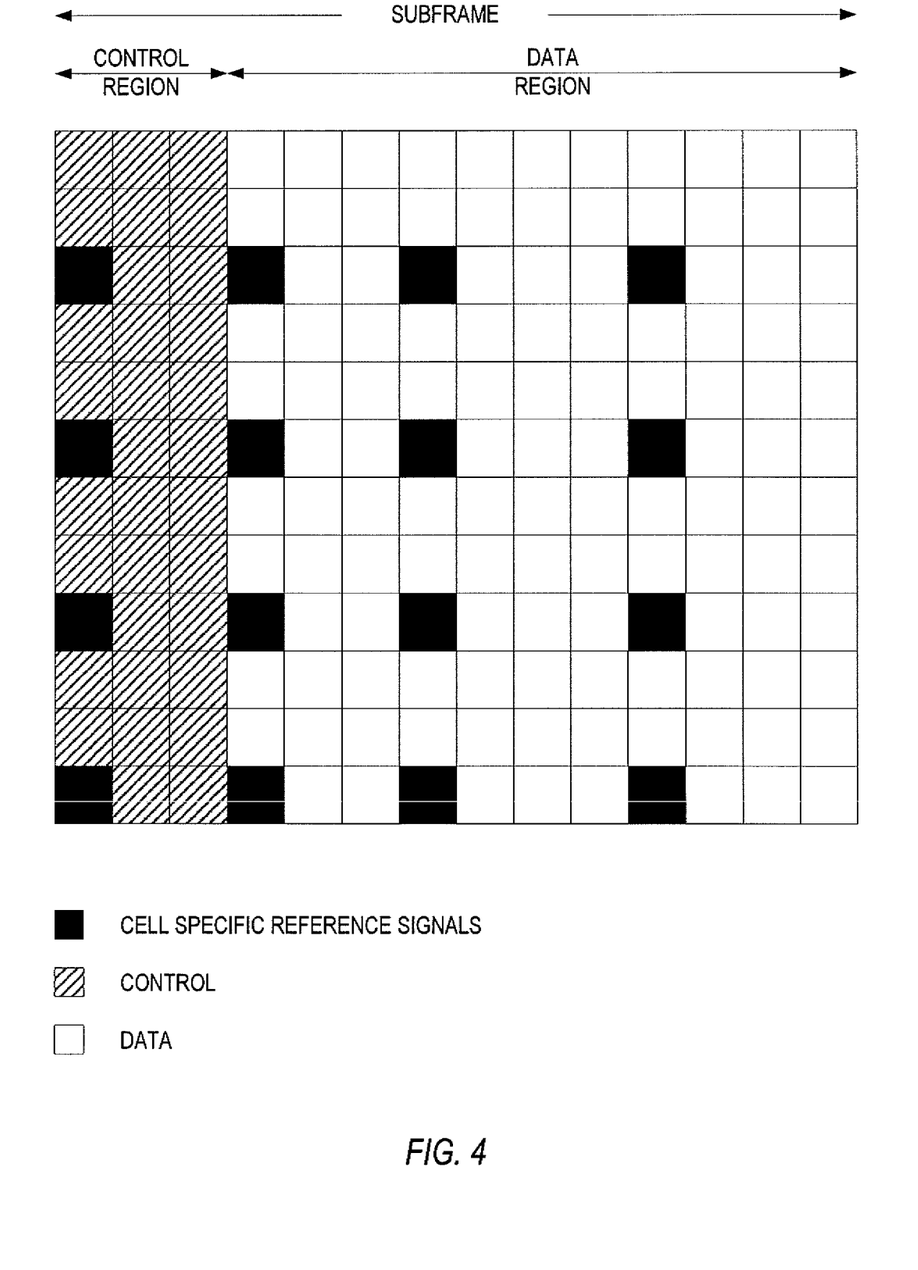
FIG. 4 illustrates an exemplary mapping of LTE physical control channels, data channels and cell specific reference signals within a downlink subframe.

FIG. 4 illustrates the mapping of the physical control channels and cell-specific reference signals in a downlink subframe. As shown in FIG. 4, physical control channels may be transmitted in the first three symbols of a subframe. User data is transmitted in the last eleven symbols, except on resource elements where reference signals are transmitted. In some embodiments, the physical control channels may use less than three symbols, so data transmission can begin in the second or third OFDM symbol. The cell specific reference signals are transmitted on designated subcarriers in the first, fifth, eighth, and twelfth subframes.

In order to establish a connection with the LTE network 10, the mobile terminal 100 needs to find and acquire synchronization with a cell 20, 30 within the network 10, read system parameters from a broadcast channel in the cell 20, 30, and perform a random access procedure to establish a connection with the cell 20, 30. The first of these steps is commonly referred to as cell search. To assist the mobile terminal 100 in the cell search procedure, the base station 200 transmits two synchronization signals on the downlink: the Primary Synchronization Signal (PSS) and the Secondary Synchronization Signal (SSS). For LTE radio frame structure type 1 (used for FDD deployments), the PSS and SSS are transmitted within the two last OFDM symbols in the first slot of subframes 0 and 5. For LTE radio frame structure type 2 (used for TDD deployments), the SSS is transmitted in the last OFDM symbol of subframe 0 and 5, whereas PSS is transmitted within the third OFDM symbol of subframe 1 and 6. The synchronization signals are transmitted in the center of the system bandwidth, occupying six resource blocks in the frequency domain. The difference in the positions of the synchronization signals in the case of FDD and TDD allows for the detection of the duplex scheme used on a carrier if this is not known in advance.

The synchronization signals transmitted in each cell 20, 30 comprise a specific set of sequences that define the cell identity. There are 504 different physical cell identities (PCIs) defined for LTE, where each PCI corresponds to one specific downlink reference-signal sequence. The PCIs are further divided into 168 cell-identity groups, with three PCIs within each group. The LTE standard specifies the location in time and frequency of the synchronization signals. The time-domain positions of the synchronization signals within the frame differ somewhat depending on if the cell 20, 30 is using frequency-division duplex (FDD) or time-division duplex (TDD). By detecting the synchronization signals, the mobile terminal 100 will acquire the timing of a cell 20, 30, and, by observing which of multiple sequences the cell is transmitting, the mobile terminal 100 can identify the cell 20, 30. Once the mobile terminal 100 has acquired frame timing and the PCI of the cell 20, 30, the mobile terminal 100 has identified the cell-specific reference signal and can receive the necessary system information for accessing the cell 20, 30.

A mobile terminal 100 does not carry out cell search only at power-up, i.e. when initially accessing the system. In order to support mobility, the mobile terminals 100 need to continuously search for, synchronize to, and estimate the reception quality of signals transmitted by neighbor cells. The mobile terminals 100 may evaluate the reception quality of signals from the neighbor cells, in comparison to the reception quality of the current serving cell, to determine whether a handover (for mobile terminals 100 in connected mode) or cell re-selection (for mobile terminals 100 in idle mode) should be carried out. For mobile terminals 100 in connected mode, the network 10 makes the handover decision based on measurement reports provided by the mobile terminals 100. As noted previously, the cell specific reference signals may be used by the mobile terminal 100 to perform the measurements.

The measurement reports provided by the mobile terminal 100 may include measurements of the reference signal received power (RSRP) and/or reference signal received quality (RSRQ). Depending on how these measurements, possibly complemented by a configurable offset, are used, the mobile terminal 100 can be connected to the cell 20, 30 with the strongest received power, or the cell 20, 30 with the lowest path loss, or a combination of the two. These selection criteria (received power and path loss) do not necessarily result in the same selected cell 20, 30. Because the output power varies for different types of cells 20, 30, it is possible that, for a given mobile terminal 100, the cells 20, 30 with the highest RSRP and RSRQ measurements and the cells 20, 30 with the lowest path loss are different. This situation is referred to herein as link imbalance.

Figure 5:
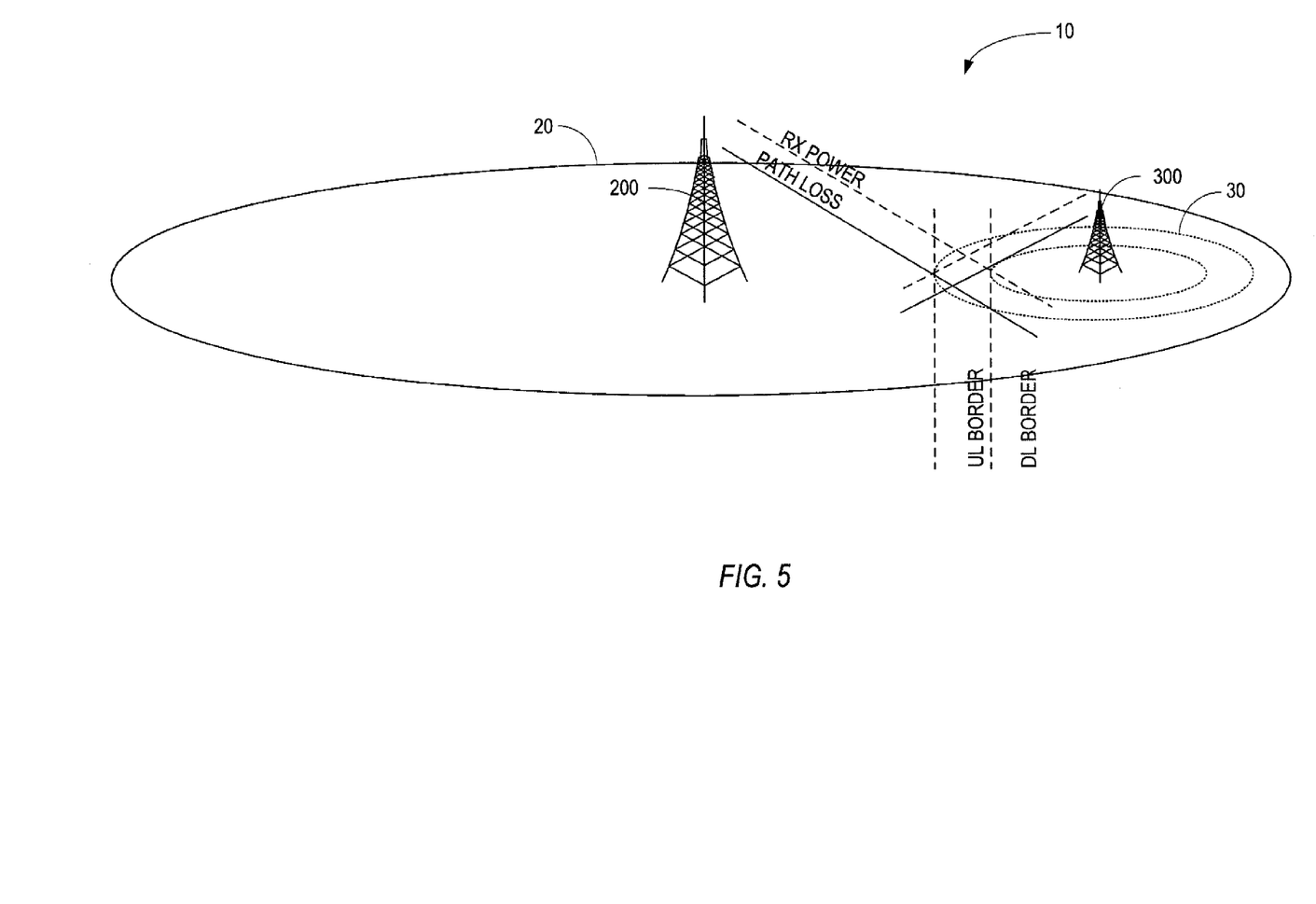
FIG. 5 illustrates link imbalance in a heterogeneous network.

FIG. 5 illustrates how link imbalance can occur in a heterogeneous network 10. It is realistically presumed for purposes of this example that the output power of a pico base station 300 in the pico cell 30 is in the order of 30 dBm or less, while the output power of the macro base station 200 is in the order of 46 dBm. Consequently, when the mobile terminal 100 is operating near the cell edge of the pico cell 30, the received signal strength from the macro cell 20 can be much larger than that of the pico cell 30. However, the path loss to the base station 200 in the macro cell 20 may be greater than the path loss to the pico base station 300 in the pico cell 30.

In FIG. 5, the downlink border indicates the point at which the received signal strengths from the macro cell 20 and pico cell 30 are equal. The uplink border indicates the point at which the path losses to the base stations 200, 300 in the macro cell 20 and pico cell 30 respectively are equal. The region between the DL and UL borders is the link imbalance zone. From a downlink perspective, it may be better for a mobile terminal 100 in the link imbalance zone to select a cell 20, 30 based on downlink received power; from an uplink perspective, it may be better to select a cell 20, 30 based on the path loss because the transmit power of the mobile terminal 100 is limited. In this scenario, it might be preferable from a system perspective for the mobile terminal 100 to connect to the pico cell 30 even if the macro downlink is up to 10-20 dB stronger than the pico cell downlink. However, inter-cell interference coordination (ICIC) between macro and pica layers is necessary when the mobile terminal 100 is operating within the link imbalance zone.

Figure 6:
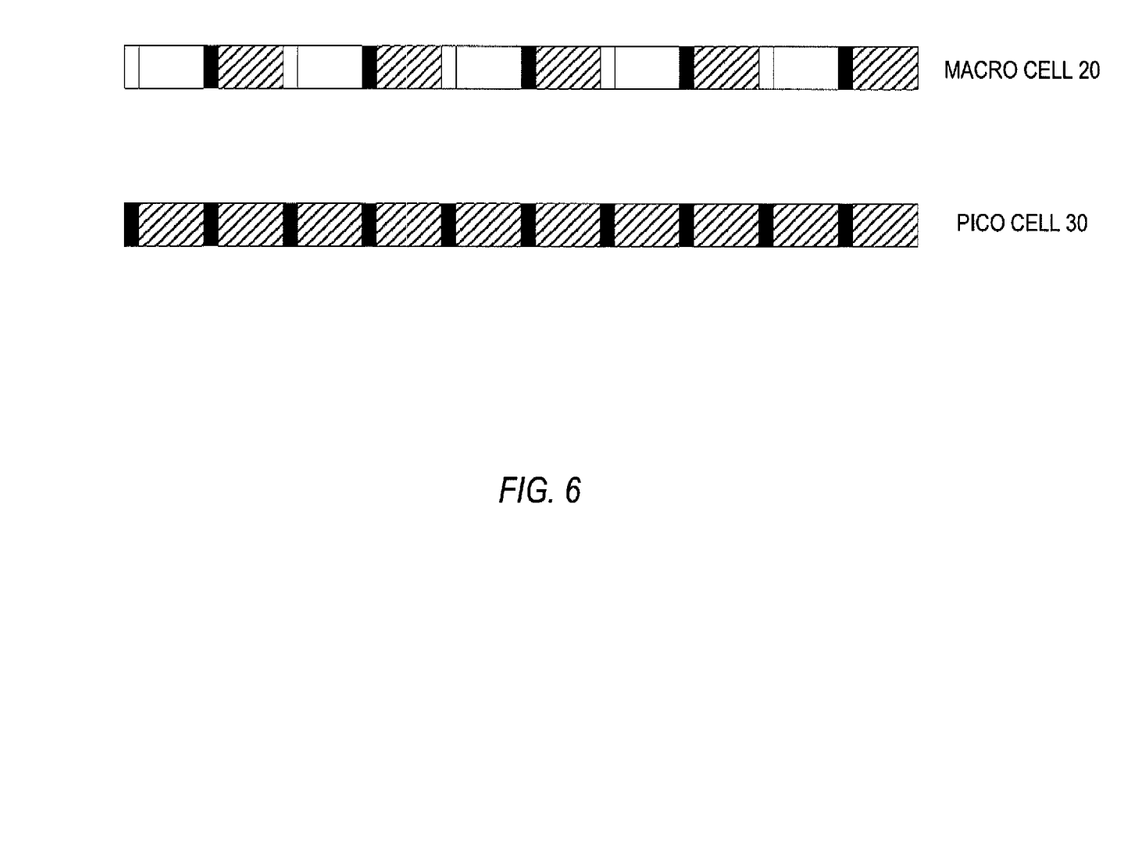
FIG. 6 illustrates inter-cell interference coordination using blank subframes in the downlink.

One approach of providing ICIC across layers is illustrated in FIG. 6, where an interfering macro cell 20 does not transmit PDCCHs, and thus no data, in some subframes. The pico cell 30 is aware of the locations of these "blank" subframes and can schedule downlink transmissions to cell edge mobile terminal 100 (mobile terminals 100 operating within the link imbalance zone) in subframes aligned with the blank subframes at the macro cell 20. The "blank" subframes are referred to herein as restricted subframes since only the pico cells are allowed to schedule downlink transmissions in these subframes. Subframes in which the macro cells are allowed to schedule downlink transmission are referred to herein as unrestricted subframes. For legacy mobile terminals, the macro cell 20 still needs to transmit cell specific reference symbols in all subframes so the restricted subframes will not be completely empty. Mobile terminals 100 operating inside the downlink border can be scheduled in all subframes.

With the introduction of restricted subframes in which the macro base station 200 avoids scheduling downlink transmissions, mobile terminals 100 served by the pico cell 30 and close to the pica base stations 300 can be scheduled in all subframes. However, mobile terminals 100 in the link imbalance zone (near the pico cell edge) receive signals with large signal strength variations in different subframes. For instance, in unrestricted subframes when the macro base stations 20 are transmitting on the downlink, pilot signals and data transmitted from the pico cell 30 may be up to 10 dB weaker than the pilot signals from the macro cell 20. If the mobile terminal 100 adapts receiver settings based on the weak pilot signals transmitted in the unrestricted subframes, bad reception performance might be the result. Therefore, a mobile terminal 100 served by a pica cell 30 and operating in the link imbalance zone should not use signals transmitted in the unrestricted subframes to adapt receiver settings.

In embodiments of the present invention, the mobile terminal 100 uses information about the subframe allocation when adapting its receiver settings. The general concept is to use pilot and/or data signals in selected subframes that reflect the interference conditions the mobile terminal 100 will experience when the receiver settings are used. For example, the mobile terminal 100 may maintain two or more sets of receiver settings. In one exemplary embodiment, the mobile terminal 100 has a first set of receiver settings for use when the mobile terminal 100 is served by a pico cell 30 and is operating in a link imbalance zone, and a second set of settings to use when the mobile terminal 100 is performing signal measurements for neighboring macro cells 20. To adapt the first set of receiver settings, the mobile terminal 100 uses only pilot and/or data signals transmitted in restricted subframes. As previously noted, the macro cells 20 do not transmit downlink data in the restricted subframes. Thus, the receiver settings will be adapted based on the interference conditions that the mobile terminal 100 will experience when operating in a link imbalance zone. To adapt the second set of receiver settings, the mobile terminal 100 uses pilot and/or data signals transmitted by the macro cell 20 in unrestricted subframes. In this case, the measurements will more accurately reflect the interference conditions as seen by the mobile terminal when performing signal measurements on neighboring macro cells.

The mobile terminal 100 may acquire the subframe allocation information in a number of different ways. The mobile terminal 100 may receive the subframe allocation information in a signaling message from either a macro cell 20 or pico cell 30. For example, the subframe allocation information may be transmitted on a broadcast channel in both macro cells 20 and pico cells 30. Thus, the mobile terminal 100 can acquire the subframe allocation information by reading it from a broadcast channel in either a macro cell 20 or pico cell 30. In some embodiments, the mobile terminal 100 may receive the subframe allocation information in a radio resource control (RRC) message during connection setup or during a handover to the pico cell 30.

The mobile terminal 100 may use information received in the selected subframes to adapt receiver settings for one or more receiver parameters. As used herein, the term "receiver parameter" denotes a variable that controls some aspect of the receiver operation and the term "setting" denotes a specific value for the parameter or variable. For example, the receiver may have one or more adjustable automatic gain control (AGC) parameters that control or affect operation of AGC circuits in the receiver. As another example, the receiver may have one or more adjustable automatic frequency control (AFC) parameters that control or affect AFC circuits in the receiver. In some embodiments, the receiver parameter may comprise a measurement parameter that controls some aspect of the signal measurement methods used by the mobile terminal 100 to perform signal quality measurements for neighboring cells. In one exemplary embodiment, the measurement parameter controls the type of pre-processing applied to reference signals prior to measurement. Such pre-processing may comprise the cancellation of reference signals transmitted by other cells from a signal of interest. For example, when the mobile terminal 100 is operating in the link imbalance zone, the measurement parameter can be set to cause the mobile terminal 100 to cancel interference attributable to reference signals transmitted by the macro cells 20 from the signals received in the restricted subframes.

Figure 7:
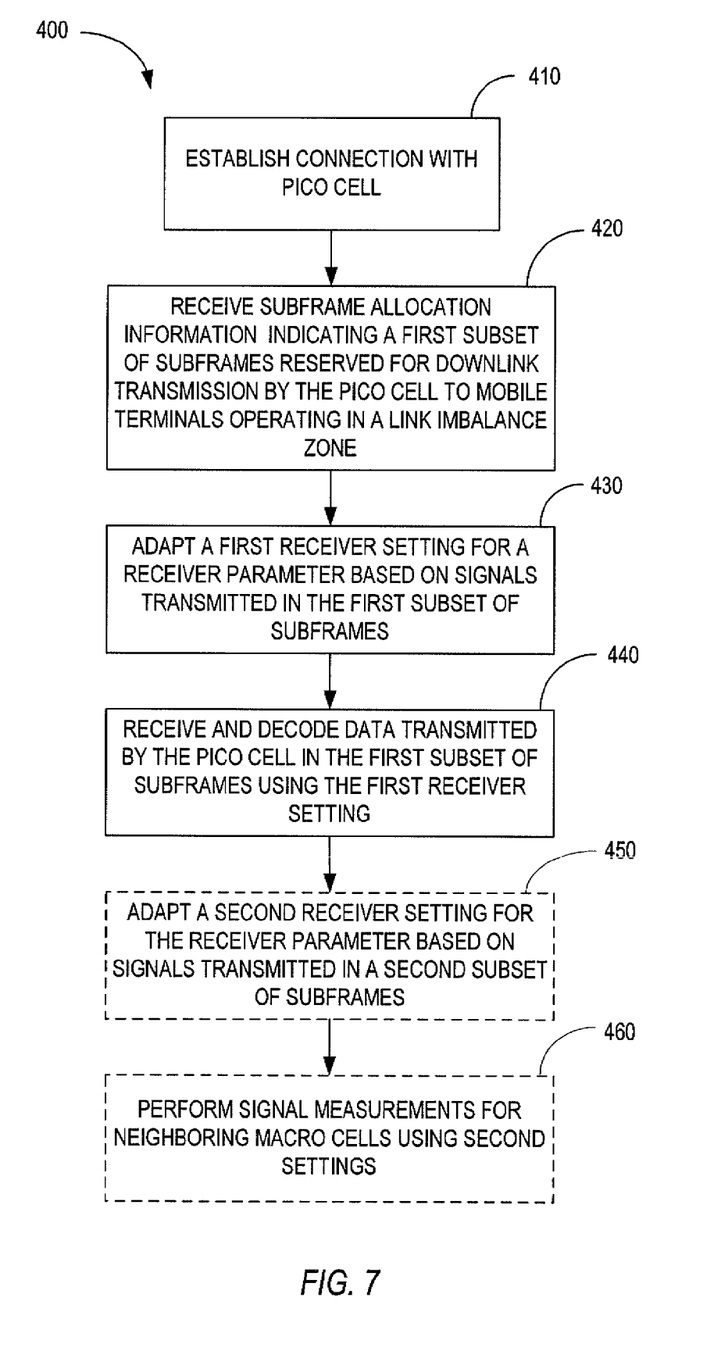
FIG. 7 illustrates an exemplary method implemented by a mobile terminal in a heterogeneous network of adapting receiver settings.

FIG. 7 illustrates an exemplary method 400 implemented by a mobile terminal 100 for adapting receiver settings. It is presumed that the mobile terminal 100 is operating in a heterogeneous network comprising macro cells 20 and pico cells 30 with overlapping coverage. The mobile terminal 100 establishes a connection with a pico cell 30 according to conventional methods (block 410). The coverage area of the pico cell 30 at least partially overlaps with the coverage area of a neighboring macro cell 20. The mobile terminal 100 receives subframe allocation information indicating that a first set of subframes, referred to herein as the restricted subframes, is reserved for downlink transmissions by the pico cell 30 to mobile terminals operating in a link imbalance zone (block 420). As noted previously, the subframe allocation information may be received from the macro cell 20 before handover to the pico cell 30 or from the pico cell 30 during or after the handover. However it is received, the mobile terminal 100 may use the subframe allocation information to select the signals it uses for adapting its receiver settings. Examples of receiver settings include settings for an automatic gain control (AGC) parameter, an automatic frequency control (AFC) parameter, and a measurement parameter as previously described. One or more sets of receiver settings may be adapted. In the exemplary embodiment, the mobile terminal 100 includes at least a first set of receiver settings to use when the mobile terminal 100 is operating in a link imbalance zone. To adapt the first set of receiver settings, the mobile terminal 100 uses only pilot or data signals transmitted in restricted subframes (block 430). As previously noted, the macro cells 20 do not transmit downlink data in the restricted subframes. Thus, the receiver settings will be adapted based on the interference conditions that the mobile terminal 100 will experience when operating in a link imbalance zone. When the mobile terminal 100 is operating in the link imbalance zone, it uses the first set of receiver settings to receive and decode downlink transmissions from the pico cell (block 440).

In some embodiments of the invention, the mobile terminal 100 may optionally adapt a second set of receiver settings used in performing signal measurements on neighboring macro cells 20. For mobility management purposes, the mobile terminal 100 needs to measure the received signal strength of neighboring macro cells 20. The mobile terminal 100 may measure either the reference signal received power (RSRP) or reference signal received quality (RSRQ) based on reference signals transmitted by the macro cells 20 in the unrestricted subframes. Because the signal level could be as much as 10 dB higher than the pico cell reference signals transmitted in the restricted subframes, a different set of AGC and/or AFC settings may be needed. Thus, the mobile terminal 100 may adapt a second set of receiver settings used for performing signal measurements based on pilot and/or data signals received in unrestricted subframes (block 450). The mobile terminal 100 may then use the second set of receiver settings to measure the signal quality (RSRP or RSRQ) associated with the macro cells 20 (block 460).

Figure 8:
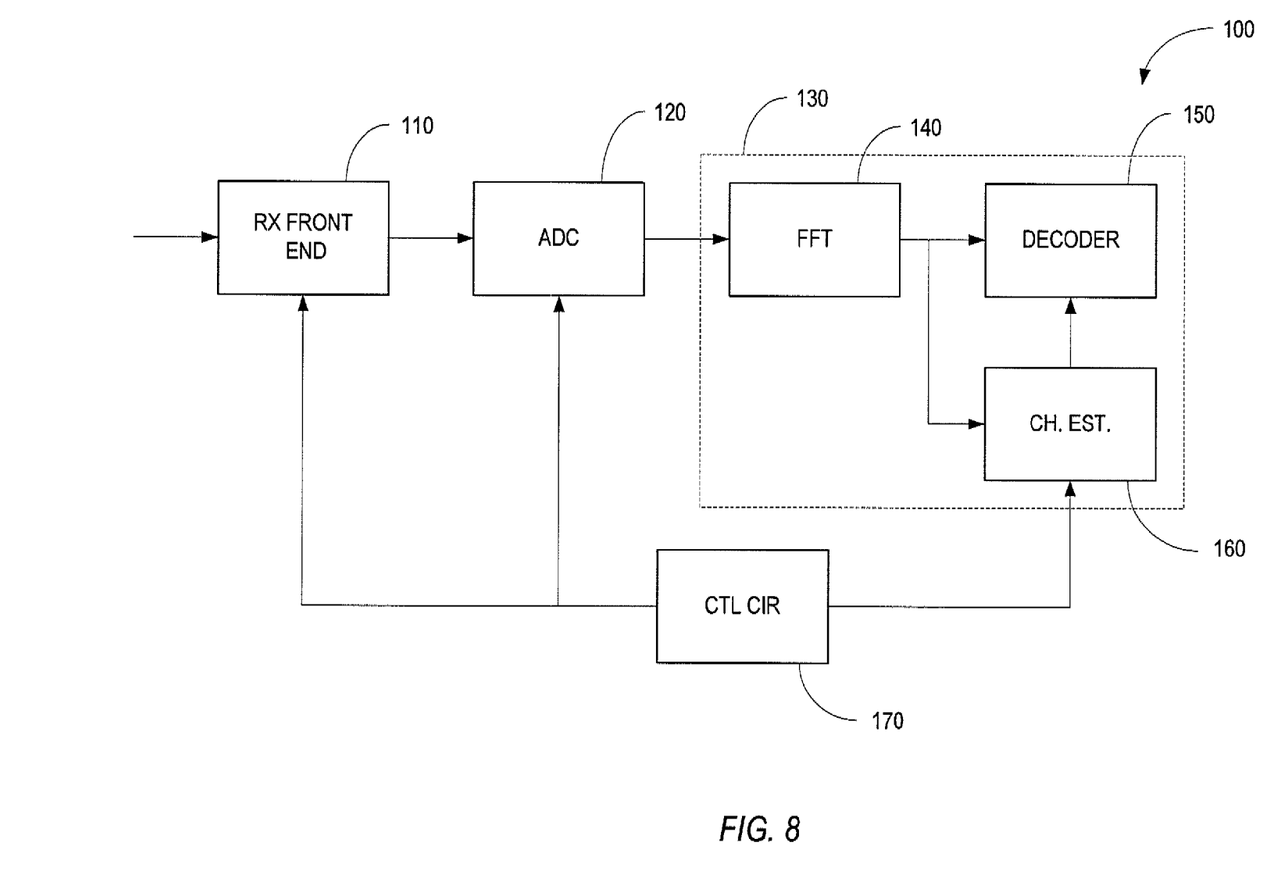
FIG. 8 illustrates an exemplary mobile terminal configured to operate in a heterogeneous network.

FIG. 8 illustrates a mobile terminal 100 according to one exemplary embodiment. The mobile terminal 100 comprises a receiver front end 110, analog-to-digital converter (ADC) circuit 120, baseband processing circuit 130, and control circuit 170. The receiver front end 110 comprises radio frequency circuits, such as AGC and AFC circuits. The receiver front end 110 filters and amplifies the received signal and downconverts the received signal to baseband frequency. The ADC circuit 120 samples the analog baseband signal to produce a digital base band signal suitable for processing by the baseband processing circuit 130. The main function of the baseband processing circuit 130 is to demodulate and decode the received signal. The baseband processing circuit 130 comprises a Fast Fourier Transform (FFT) circuit 140 to demodulate the received signal to produce demodulated symbols, a decoder 150 to decode the demodulated symbols, and a channel estimator 160 to produce channel estimates for use by the demodulator. The control circuit 170 controls the overall operation of the mobile terminal 100. One of the functions performed by the control circuit 170 is adapting receiver settings as previously described. For example, the control circuit may adapt a receiver parameter that controls the operation of the AGC and/or AFC circuits in the receiver front end 110. The baseband processing circuit 130 and control circuit 170 may be implemented by one or more microprocessors, hardware, firmware, or a combination thereof.

The present invention provides improved receiver performance for mobile terminals 100 served by a pico cell 30 and operating in a link imbalance zone. In this scenario, the mobile terminal 100 can adapt receiver settings based only on pilot and/or data signals transmitted in restricted subframes. Thus, the receiver settings are likely to be a better match for the interference conditions seen by the terminal 100 when operating in the link imbalance zone. The mobile terminal 100 may also adapt a second set of receiver settings for use in performing signal measurements on neighboring macro cells 20 based on pilot and/or data signals in unrestricted subframes. The mobile terminal 100 may switch between the first set of receiver settings when receiving downlink transmission from the pico cell and the second set of receiver settings when making signal quality measurements.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a heterogeneous network including macro cells and pico cells with overlapping coverage, a method implemented by mobile terminal of adapting receiver settings to receive downlink transmissions from a pico cell, said method comprising:
   establishing a connection with the pico cell;
   receiving subframe allocation information from the network indicating a first subset of subframes reserved for downlink transmissions by the pico cell to a mobile terminal operating in a link imbalance zone;
   adapting a first receiver setting for a receiver parameter based on signals transmitted only in the first subset of subframes, and adapting a second receiver setting for said receiver parameter based on signals transmitted in a second subset of subframes, wherein said first setting is for use by said mobile terminal when operating in a link imbalance zone; and
   receiving and decoding data transmitted in the first subset of subframes by the pico cell using said first receiver setting for said receiver parameter and receiving and decoding data transmitted by a neighboring macro cell in said second subset of subframes using said second receiver setting for said receiver parameter when the mobile terminal is operating in a link imbalance zone.

2. The method of claim 1 wherein adapting a first receiver setting for a receiver parameter based on signals transmitted during the first subset of subframes comprises adapting a receiver setting of an automatic gain control parameter for an automatic gain control circuit based on signals transmitted in the first subset of subframes.

3. The method of claim 1 wherein adapting a first receiver setting for a receiver parameter based on signals transmitted during the first subset of subframes comprises adapting a receiver setting of an automatic frequency correction parameter for an automatic frequency correction circuit based on signals transmitted in the first subset of subframes by the pico cell.

4. The method of claim 1 adapting a first receiver setting for a receiver parameter based on signals transmitted during the first subset of subframes comprises adapting a receiver setting of a measurement parameter for a signal measurement circuit based on signals transmitted in the first subset of subframes by the pico cell.

5. The method of claim 1 further comprising performing signal quality measurements on the received signals from neighboring macro cell.

6. The method of claim 1 further comprising switching, by said mobile terminal, between said first and second receiver settings to receive signals in said first and second sets of subframes respectively.

7. A mobile terminal comprising:
a receiver to receive signals transmitted by a base station on a downlink channel;
a transmitter to transmit signals to the base station on an uplink channel;
a processor configured to:
  establish a connection with a pico cell;
  receive subframe allocation information from the network indicating a first subset of subframes reserved for downlink transmissions by the pico cell;
  adapt a first receiver setting for a receiver parameter based on signals transmitted only in the first subset of subframes, and adapting a second receiver setting for said receiver parameter based on signals transmitted in a second subset of subframes, wherein the first receiver setting is for use when the mobile terminal is operating in a link imbalance zone; and
  receive and decode data transmitted in the first subset of subframes by the pico cell using said first subset of receiver settings and receiving and decoding data transmitted by a neighboring macro cell in said second subset of subframes using said second receiver setting for said receiver parameter.

8. The mobile terminal of claim 7 wherein the processor is configured to adapt a receiver setting of an automatic gain control parameter for an automatic gain control circuit based on signals transmitted in the first subset of subframes.

9. The mobile terminal of claim 7 wherein the processor is configured to adapt a receiver setting of an automatic frequency correction parameter for and automatic frequency correction circuit based on signals transmitted in the first subset of subframes.

10. The mobile terminal of claim 7 wherein the processor is configured to adapt a signal measurement parameter receiver setting for a signal measurement circuit based on signals transmitted in the first subset of subframes by the pico cell.

11. The mobile terminal of 7 wherein the processor is further configured to perform signal quality measurements on the signals transmitted by neighboring macro cell in said second subset of subframes.

12. The mobile terminal of claim 7 wherein the processor is further configured to switch between said first and second receiver settings to receive signals in said first and second sets of subframes respectively.

* * * * *